Sept. 30, 1958     L. R. PISTOLES     2,853,789
INTERNAL CYLINDER GAGE

Filed July 28, 1955     2 Sheets-Sheet 1

INVENTOR.
LAMBERT R. PISTOLES
BY *F. P. Keiper*
ATTORNEY

Sept. 30, 1958     L. R. PISTOLES     2,853,789
INTERNAL CYLINDER GAGE
Filed July 28, 1955     2 Sheets-Sheet 2
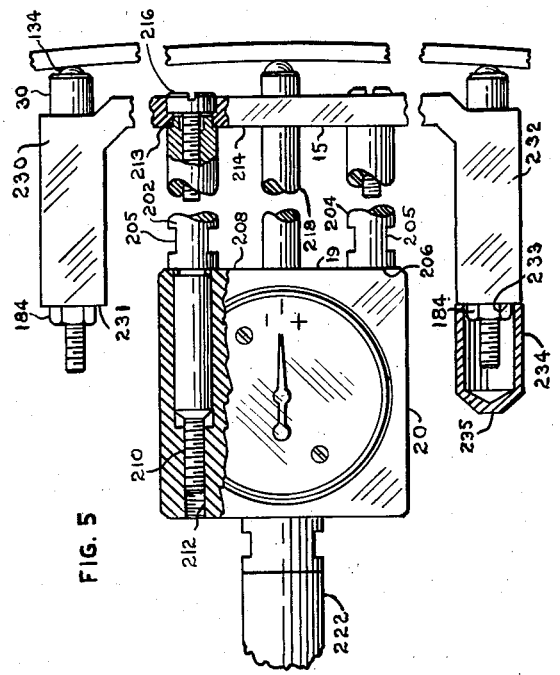
FIG. 5
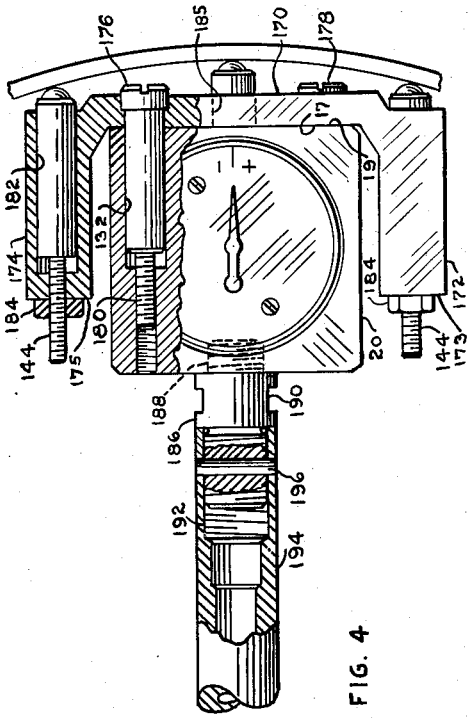
FIG. 4
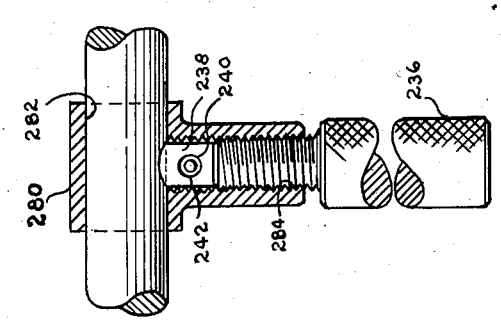
FIG. 6
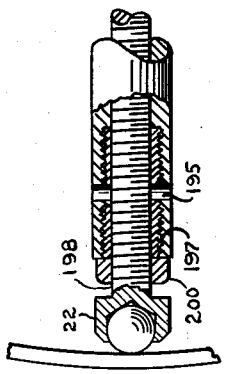
INVENTOR.
LAMBERT R. PISTOLES
BY
ATTORNEY United States Patent Office 2,853,789
Patented Sept. 30, 1958

2,853,789

INTERNAL CYLINDER GAGE

Lambert R. Pistoles, Wilmington, Del.

Application July 28, 1955, Serial No. 524,997

8 Claims. (Cl. 33—178)

This invention relates to gages, and more particularly to gages adapted to measure the internal diameter of cylindrical objects.

In measuring the internal diameter of cylindrical objects, it is important that the measuring device be aligned with a diameter of the object. Failure to use care in this respect results in the measurement of a chordal distance less than the diameter, with consequent inaccuracy. In gaging cylindrical objects in mass production it is desirable to provide an indicator which may be quickly applied to the object for an indication, with assurance that the indication will be that of true internal diameter.

It is accordingly an object of the present invention to provide, in a gage of the type described, a mechanism for assuring indications of true diameter.

It is further an object of the invention to provide in such a gage an arrangement whereby the gage may be utilized on a wide range of diameters, with like assurance of accuracy.

It is a further object of the invention to provide a gage which is composed of few parts, of rugged construction, and which may be readily set to gage a plurality of selected ranges of internal diameter measurements.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings wherein like reference characters indicate like parts:

Figure 4 is a plan view with parts in section of the gage adapted for a range of larger diameter measurements;

Figure 5 is a plan view with parts in section, of the gage adapted for a still larger range of diameter measurements; and Figure 6 is a fragmentary view partly in section of a handle for the gage.

Figure 1:
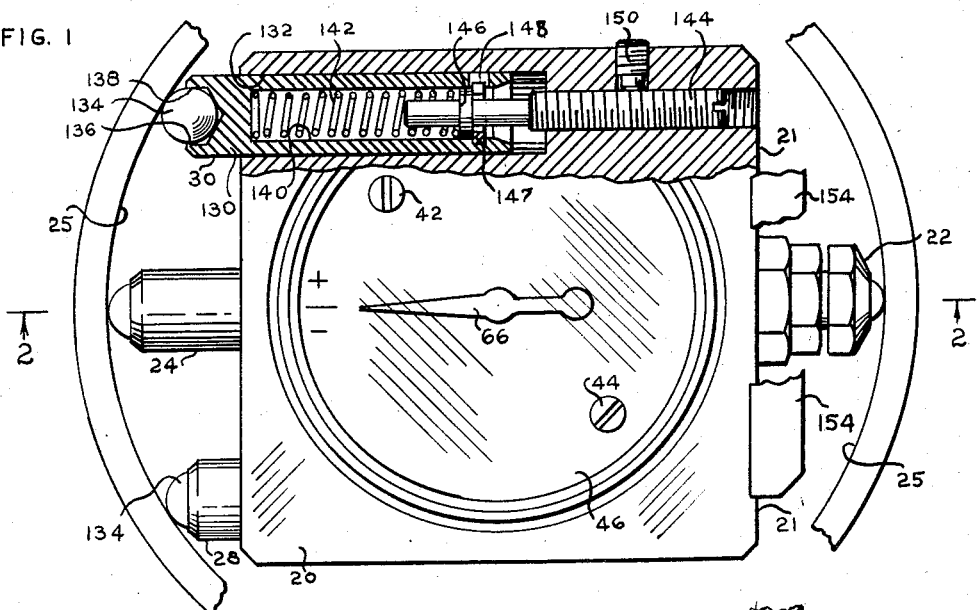
Figure 1 is an enlarged plan view with parts in section of one application of the gage.
Figure 2:
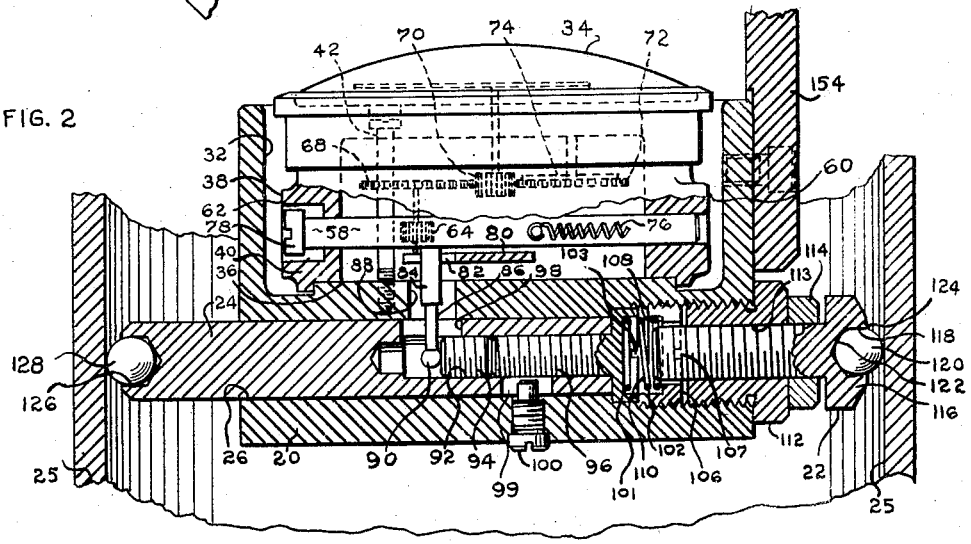
Figure 2 is an enlarged sectional view of the gage shown in Figure 1 taken substantially on the line 2—2 of Figure 1.
Figure 3:
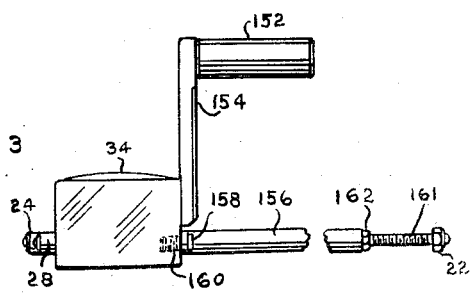
Figure 3 is a side elevational view of the gage with an extension.

Referring to Figures 1-3 inclusive there is shown a gage block 20 having a relatively fixed contact pin 22, a gage actuating movable pin 24 aligned therewith and slidable in the bore 26 of the block, and adapted to provide accurate diameter measurements when the axes of said pins are held on a diameter of an internal cylindrical workpiece such as 25. To assure centering of the gage pin on a diameter, there are provided adjustable spring plunger pins 28 and 30 laterally disposed on either side of the contact and gage pins, in symmetrical arrangement. The block is provided with a circular recess 32 in which is positioned in a protected manner a dial indicator 34. The bottom of the recess has a raised circular deck 36, the latter being adapted to substitute for, and be received in place of the circular back plate of a stock dial indicator of the type shown. The dial indicator has a circular body or casing portion 38 having an annular shoulder 40 adapted to receive the raised deck 36, and the indicator is adapted to be held in place through screws such as 42 and 44, the heads of which are seated in the dial plate 46, and threaded in the raised deck 36. The construction is similar to that shown in my Patent No. 2,610,409 issued September 16, 1952.

The dial indicator shown includes the usual indicator rod 58, slidably positioned in apertured bosses 60 and 62. The rod has been reduced in length by removing a portion of the right hand end thereof as seen in Figure 2. The rod or pin is provided with rack teeth operating on a pinion 64, in turn actuating a dial hand 66 through the gear 68 and pinion 70. Slack take-up is provided by the gear 72 and hair spring 74, all as will be readily understood in the art. The rod is biased to move to the right by a tension spring 76 also connected to the casing 38, and movement of the rod is limited by the shoulder formed by the screw head 78.

The bearing plate 80 within the indicator is slotted as at 82, to provide access to the dial rod 58 and permit the rigid insertion into such rod of a ball head actuating pin 84. The pin has a reduced shank portion 86, and may be secured in the rod by any suitable means such as a driven or screw thread fit. The pin extends through an aperture 88 in the deck 36 to intersect the pin bore 26, and the ball head 90 is so located as to lie on the axis of the bore.

The gage pin 24 is provided with a concentric bore 92 extending from one end, which is threaded to receive threaded members in the form of a socket head set screw 94, and a locking screw 96. The pin is also slotted as by milling at 98 to permit the ball head and shank portion 86 to extend into the pin so that the ball head may bear against the transverse end surface of the socket head set screw 94. The slot 98 is of greater width than the shank diameter of the ball head pin.

A key screw 100 threaded into the block engages a slot 99 in the pin 24, and provides an outside limit for the pin movement, and prevents the pin from turning.

The locking screw 96 has an enlarged head 101 which lies within the enlarged diameter portion 102 of the bore 26, the head being adapted to limit movement of the pin to the left, as shown in Figure 2. The enlarged bore 102 is threaded and has positioned therein a split collar 106, having an inwardly directed spring seating flange 108. The enlarged head 101 and collar 106 provide opposed spring recesses for receiving the coil spring 110. The head 101 is provided with a screw driver slot 103 or other means for tightening the screw 96, and the collar 106 may be similarly provided as at 107. The split collar is of resilient material and is slightly contracted when threaded in place to provide a friction grip with the threads when set in place.

In the end of the bore, there is threaded a bushing 112 having an internally threaded bore 113 adapted to receive the shank of the fixed pin 22, the pin being provided with an enlarged head, of hexagonal section as at 116, and is also provided with a recess 118 to receive a contact ball 120, the ball being adapted to engage the concentric conical seat 122, and being held in the recess by peening over the lip 124 of the recess. It will be understood that the ball is free to roll within the recess.

The opposite end of the pin 24 is similarly provided with a conical bottom recess 126, and a contact ball 128.

The plunger pins 28 and 30 each comprise a body portion 130 having a cylindrical exterior adapted to freely slide within the bore 132 in the block 20. Each pin is provided with a contact ball 134 free to roll and to be held in a coaxial conical bottomed recess 136, the lip 138 being peened over. The pin is further provided with a bore 140 adapted to receive a calibrated coil spring 142, and an adjusting screw 144, the latter being threaded in a reduced diameter extension of the bore 132. The screw 144 is provided with an annular shoulder 146, one face of which engages an end of the spring 142, and the other face of which is adapted to be urged against a split spring lock ring 147 set in an internal annular groove in the bore 140. Radial apertures such as 148, intersecting the groove provide means for unseating the lock ring 147. It will be seen that each of the pins 28 and 30 is axially adjustable in their respective block bores, by threading the adjusting screws 144. When the screws are suitably adjusted, they are held by brass nosed set screws as 150 threaded in the block 20.

In practice, with the springs 142 of each of the pins 28 and 30 alike, the plungers are set so that each projects an equal distance from the block, the distance being selected in accordance with the radius of curvature of the cylinder bore to be gaged. When the gage is positioned in place, the pins are each yieldingly moved into their respective bores, and in so doing provide an equalizing pressure upon the surface to be gaged so as to cause the axis of the gage pin to coincide with a diameter, or lie in a diametrical plane of the bore. By rocking the gage, with the axis lying upon the diametrical plane, a minimum reading will appear on the dial when radial alignment occurs, without danger of error by reason of the gage axis being located on a chord instead of a diameter of the work piece.

As shown in Figure 3, the gage may be provided with a handle 152 mounted on a bracket 154 secured to the block 20. Also there is shown the gage provided with an extension 156 for the contact 22, for accommodating a greater range of diameters. The extension is provided with wrench flats 158, and has a bushing end 160 threaded in the block 20. The other end is adapted to threadedly receive the shank 161 of the contact 22, a lock nut 162 being provided thereon.

As shown in Figure 4, the block 20 with its indicator is provided with a bridge plate 170 having plunger housings 172 and 174 at its opposite extremities. The block 20 is prepared to receive the bridge plate 170, by first removing each of the plunger body portions 130 and adjusting screws 144 from the block bores 132 as assemblies. The bridge is then secured to the block by screws 176 and 178 which simulate the removed assemblies, and which have threaded shanks 180 to extend into the threaded part of the bore 132. A plunger body part and its adjusting screw, as an assembly, is then inserted in each of the plunger housings 172 and 174, the setting screw 144 of each assembly being threaded in the end of the bore 182, and provided with a lock nut 184. The bridge member is provided with an aperture 185, through which the gage pin freely extends.

The block 20 may be provided with extensions of various lengths for the contact 22. As also shown in Figure 4, the extension comprises a member 186 having a threaded nose 188 for reception in the enlarged threaded end of the bore 26 of the gage block. The member is provided with wrench flats 190, and a reduced diameter shank 192 threaded in a sleeve 194. A pin 196 may be employed to lock the parts together. The other end of the sleeve is internally reamed and threaded to receive the threaded sleeve 197 and is pinned as at 195. The threaded sleeve 197 is threaded to receive threaded shank 198 of the contact 22, and a lock nut 200 is provided.

The shank 198 as well as the extensions may be of different length so that a wide range of diameters can be accommodated.

For still larger diameters, an extended bridge as shown in Figure 5 may be employed, and in order to locate the gage inwardly from the surface being gaged, the bridge is supported on extension members. As shown, the block 20 is provided with extensions 202 and 204, one end of which simulates the plunger assembly, and is adapted to be inserted into each of the bores 132 after removal of the assemblies. The extensions have wrench flats 205 and a shoulder 206 adapted to engage the end face 208 of the block 20, and the threaded end 210 is received in the threaded block bore 212. The other end of each extension is provided with a reduced diameter portion 213 received in a recess in the bridge member 214, and is held to the bridge member by a screw such as 216. The gage pin 218 is selected of a length to match the extensions 202 and 204, and is substituted for the shorter pin 24. The rear contact 22 can be set at any desired distance as by use of an extension member 222 or members as described in Figure 4 or Figure 3. In all modifications the gage and contact pins are coaxial.

To initially adjust the gage of Figure 1, the distance between the true planar surface 21, which is at right angles to the axis of the gage pin 24, and each of the balls 134 of the plungers 28 and 30, are set at equal distances by a micrometer, when the plungers are freely extended, the adjustment being made by the setting of screws 144, and then locking the screws by tightening the set screws 150. In the modifications of Figures 4 and 5, the block surface 19 is a true surface parallel with surface 21, and the surfaces 15 and 17 are true planar surfaces, and are likewise mounted parallel to the surface 19. The ends 173 and 175 of the plunger housings 172 and 174 (see Figure 4) are parallel with the surface 17, and equally spaced therefrom. Similarly the ends 231 and 233 of the plunger housings 230 and 232 (see Figure 5) are parallel with the surface 15, and equally spaced therefrom. A thimble, or spacer cap 234, adapted to freely fit over the nut 184 and seat on the ends 173 and 175, or 231 and 233 is placed in position, as indicated for example in Figure 5, and the distance between each of the plunger balls and the transverse true end 235 of the cap when placed on the respective housing is then set so that the distance between the surfaces 173 and 175 and the respective plunger balls, or 231 and 233, and their respective plunger balls are equal. Thereupon the nuts 184 are tightened, and the gage rechecked.

A suitable handle for supporting the gage from an extension sleeve such as 194 in Figure 4, is shown in Figure 6. A T fitting 280 having a bore 282 to receive the extension 194, is provided with a bore at right angles thereto, which bore is internally threaded as at 284 to receive a handle 236. The threaded end of the handle is adapted to bear against a brass block 238 loosely held in place by a small pin 240 extending across the fitting, and loosely through an aperture 242 in the block 238. A tight grip can then be had upon the extension 194, by turning the handle and thereby applying pressure to the block 238.

It will be seen that by the arrangements shown in Figures 1 and 2, Figure 4, and Figure 5, that the basic gage block can be adapted to a plurality of ranges by supplying bridge parts and extension members as shown. In practice, it is essential to use a bridge of sufficient width to space the contacts 28 and 30 as widely as possible, for a maximum centering effect. However, the angle of the tangent of the surface being tested at the point of contact must not approach or exceed the angle of the conical ball seats at the base of the recesses 136, since it is essential that the ball be urged to seat on the conical seat, with the ball center on the axis of the plunger while the ball is in contact with the cylindrical surface. The apex angle of the conical seat, if 120 degrees, will permit the gage plungers to contact internal surfaces at points spaced less than 60 degrees apart, and in practice at points spaced about 45° or somewhat less. The combined effect of each of the contact balls 134 urges the gaging pin 24 to locate on a diameter by reason of the uniform spring action of the calibrated springs 142, it being understood that due to the curvature at the point of ball contact, any misalignment will cause one ball contact to be moved inwardly, a greater increment than the other, because of the increasing angle of the tangent at the point of contact. Thus the calibrated springs will urge the points of contact of the contacts 28 and 30 to engage the surface at points the tangents of which have equal angles wih respect to the axis of the gage pin.

While several modifications of the invention have been shown and described, it is to be understood that the invention is not limited thereto. As many variations in use and operation and changes in construction and arrangement may be made without departing from the spirit of the invention, as will be apparent to those skilled in the art, reference will be had to the appended claims for a definition of the limits of the invention.

What is claimed is:

1. A gage for measuring internal diameters comprising a gage block having an indicator mounted thereon, a settable pin mounted in said block and adapted to contact the internal wall of a cylindrical work object, a movable pin mounted in said block, and aligned with said settable pin, said movable pin having a contact end adapted to contact the internal wall of the cylindrical work object, at a point diametrically opposed to the point of contact of said settable pin, means for actuating the indicator in response to movement of said movable pin, two centering pin assemblies independent of each other and mounted in said block on opposite sides of the axis of said movable pin, like calibrated spring biased plungers in each of said assemblies movable on axes coplanar and parallel with and equally spaced from said pin axis, said plungers each having cylinder wall contact members, and means for setting said assemblies axially thereof independently of each other to position said assemblies symmetrical with respect to each other about said pin axis, with said contact members and contact end lying on an arc having a radius coincident with the pin axis.

2. A gage for measuring internal diameters comprising a gage block having an indicator mounted thereon, a settable pin mounted in said block and adapted to contact the internal wall of a cylindrical work object, a movable pin mounted in said block, and aligned with said settable pin, said movable pin having a contact end adapted to contact the internal wall of the cylindrical work object, at a point diametrically opposed to the point of contact of said settable pin, means for actuating the indicator in response to movement of said movable pin, two centering pin assemblies independent of each other and mounted in said block on opposite sides of the axis of said movable pin, like calibrated spring biased plungers in each of said assemblies movable on axes coplanar and parallel with and equally spaced from said pin axis, said plungers each having cylinder wall ball contact members and conical coaxial seats for centering said balls upon the respective axes of said plungers, and means for setting said assemblies axially thereof independently of each other to position said assemblies symmetrical with respect to each other about said pin axis, with said contact members and contact end lying on an arc having a radius coincident with the pin axis.

3. A gage for measuring internal diameters comprising gage block means having an indicator mounted thereon, a settable pin mounted in said block means and adapted to contact the internal wall of a cylindrical work object, a movable pin mounted in said block means, and aligned with said settable pin, said movable pin having a contact end adapted to contact the internal wall of the cylindrical work object, at a point diametrically opposed to the point of contact of said settable pin, means for actuating the indicator in response to movement of said movable pin, means to limit the movement of said pin between limits less than the range of said indicator, two centering pin assemblies independent of each other and mounted in said block means on opposite sides of the axis of said movable pin, like calibrated spring biased plungers in each of said assemblies movable on axes coplanar and parallel with and equally spaced from said pin axis, said plungers each having cylinder wall contact members, and means for setting said assemblies axially thereof independently of each other to position said assemblies symmetrical with respect to each other about said pin axis, with said contact members and contact end lying on an arc having a radius coincident with the pin axis.

4. A gage for measuring internal diameters comprising a gage block means having an indicator mounted thereon, a settable pin mounted in said block means and adapted to contact the internal wall of a cylindrical work object, a movable pin mounted in said block means, and aligned with said settable pin, said movable pin having a contact end adapted to contact the internal wall of the cylindrical work object, at a point diametrically opposed to the point of contact of said settable pin, means for actuating the indicator in response to movement of said movable pin, two centering pin assemblies mounted in said block means on opposite sides of the axis of said movable pin, like calibrated spring biased plungers in each of said assemblies movable on axes coplanar and parallel with and equally spaced from said pin axis, said plungers each having cylinder wall contact members, and means for setting said assemblies axially thereof to position said assemblies symmetrical with respect to each other about said pin axis, with said contact members and contact end lying on an arc having a radius coincident with the pin axis, said block means comprising a block having laterally disposed bores for receiving said centering pin assemblies and a bridge member secured to said block, by threaded members simulating said assemblies received in said bores, and having laterally spaced bores in which said centering pin assemblies are disposed.

5. A gage for measuring internal diameters comprising a gage block having an indicator mounted thereon, a settable pin mounted in said block and adapted to contact the internal wall of a cylindrical work object, a movable pin mounted in said block, and aligned with said settable pin, said movable pin having a contact end adapted to contact the internal wall of the cylindrical work object, at a point diametrically opposed to the point of contact of said settable pin, means for actuating the indicator in response to movement of said movable pin, two centering pin assemblies independent of each other and mounted in said block on opposite sides of the axis of said movable pin having independent yieldingly biased plungers movable on axes coplanar and parallel with and equally spaced from said pin axis, said plungers each having a cylinder wall ball contact member, and conical seats in said plungers for said balls whereby to align said balls with said plunger axes.

6. Gage for measuring internal diameters comprising a gage block having an indicator mounted thereon, a settable pin mounted in said block and adapted to contact the internal wall of a cylindrical work object, a movable pin mounted in said block, and aligned with said settable pin, said movable pin having a contact end adapted to contact the internal wall of the cylindrical work object, at a point diametrically opposed to the point of contact of said settable pin, means for actuating the indicator in response to movement of said movable pin, two centering pin assemblies independent of each other and mounted in said block on opposite sides of the axis of said movable pin, like calibrated spring biased plungers in each of said assemblies independent of each other and movable on axes coplanar and parallel with and equally spaced from said pin axis, said plungers each having a cylinder wall ball contact member, conical seats for said balls in said plungers for aligning said balls with the axis thereof, and means for setting said assemblies axially thereof to position the balls of said assemblies symmetrical with respect to each other about said pin axis.

7. A gage for measuring internal diameters comprising a gage block having an indicator mounted thereon, a settable pin mounted in said block and adapted to contact the internal wall of a cylindrical work object, a movable pin mounted in said block, and aligned with said settable pin, said movable pin having a contact end adapted to contact the internal wall of the cylindrical work object, at a point diametrically opposed to the point of contact of said settable pin, means for actuating the indicator in response to movement of said movable pin, and two centering pin assemblies mounted in said block on opposite sides of the axis of said movable pin, each of said assemblies comprising like calibrated spring biased plungers movable on axes coplanar and parallel with and equally spaced from said pin axis, said plungers each having a bore to receive a spring, and having extending thereinto an adjusting screw threaded in said block, with an annular shoulder within said bore, a spring in said bore bearing against one side of said shoulder, and a plunger carried abutment adapted to engage the other side of said shoulder.

8. A gage for measuring internal diameters comprising a gage block having an indicator mounted thereon, a settable pin mounted in said block and adapted to contact the internal wall of a cylindrical work object, a movable pin mounted in said block, and aligned with said settable pin, said movable pin having a contact end adapted to contact the internal wall of the cylindrical work object, at a point diametrically opposed to the point of contact of said settable pin, means for actuating the indicator in response to movement of said movable pin, and two centering pin assemblies mounted in said block on opposite sides of the axis of said movable pin, each of said assemblies comprising like calibrated spring biased plungers movable on axes coplanar and parallel with and equally spaced from said pin axis, said plungers each having a bore to receive a spring, and having extending thereinto an adjusting screw threaded in said block, with an annular shoulder within said bore, a spring in said bore bearing against one side of said shoulder, and a plunger carried abutment adapted to engage the other side of said shoulder, said plungers each having ball contacts mounted in the end thereof, and conical seats for said ball contacts.

References Cited in the file of this patent

UNITED STATES PATENTS

| | | |
|---|---|---|
| 1,625,766 | Simpson | Apr. 19, 1927 |
| 2,302,355 | Sumner | Nov. 17, 1942 |
| 2,438,274 | Eisele | Mar. 23, 1948 |
| 2,581,473 | Eisele | Jan. 8, 1952 |
| 2,601,496 | Boat | June 24, 1952 |
| 2,610,409 | Pistoles | Sept. 16, 1952 |
| 2,654,157 | Eisele | Oct. 6, 1953 |